(12) United States Patent
Kummer et al.

(10) Patent No.: US 9,628,846 B2
(45) Date of Patent: *Apr. 18, 2017

(54) METHOD AND APPARATUS FOR RECORDING A VIDEO PROGRAM FOR USER INSTRUCTION

(71) Applicant: ECHOSTAR TECHNOLOGIES L.L.C., Englewood, CO (US)

(72) Inventors: David A. Kummer, Highlands Ranch, CO (US); Michael T. Dugan, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/789,681

(22) Filed: Jul. 1, 2015

(65) Prior Publication Data
US 2015/0312620 A1 Oct. 29, 2015

Related U.S. Application Data

(63) Continuation of application No. 10/940,077, filed on Sep. 13, 2004, now Pat. No. 9,088,819.

(51) Int. Cl.
| | | |
|---|---|---|
| *H04N 21/433* | (2011.01) | |
| *H04N 21/432* | (2011.01) | |
| *H04N 21/488* | (2011.01) | |
| *H04N 21/8545* | (2011.01) | |
| *H04N 21/61* | (2011.01) | |
| *G09B 19/00* | (2006.01) | |
| *H04N 5/76* | (2006.01) | |
| *H04N 21/81* | (2011.01) | |
| *H04N 21/4147* | (2011.01) | |
| *H04N 21/442* | (2011.01) | |
| *H04N 21/443* | (2011.01) | |

(52) U.S. Cl.
CPC ......... *H04N 21/4325* (2013.01); *G09B 19/00* (2013.01); *H04N 5/76* (2013.01); *H04N 21/4147* (2013.01); *H04N 21/4424* (2013.01); *H04N 21/4432* (2013.01); *H04N 21/4882* (2013.01); *H04N 21/6143* (2013.01); *H04N 21/8166* (2013.01); *H04N 21/8545* (2013.01)

(58) Field of Classification Search
CPC .......... H04N 21/4147; H04N 21/4325; H04N 21/8166; H04N 21/4882; H04N 21/8545; H04N 21/6143; H04N 5/76; G09B 19/00
USPC ............................................ 725/34, 109–110
See application file for complete search history.

(56) References Cited

U.S. PATENT DOCUMENTS

| | | | | |
|---|---|---|---|---|
| 5,955,988 A | * | 9/1999 | Blonstein | ............... H04N 7/20 342/357.31 |
| 2002/0026636 A1 | * | 2/2002 | LeComte | ............. H04N 5/4401 725/31 |
| 2002/0046407 A1 | * | 4/2002 | Franco | ................... H04N 5/782 725/110 |
| 2002/0174430 A1 | * | 11/2002 | Ellis | .................... G11B 27/005 725/46 |
| 2003/0067554 A1 | * | 4/2003 | Klarfeld | ............... G11B 27/105 348/461 |

(Continued)

*Primary Examiner* — Brian T Pendleton
*Assistant Examiner* — Alan Luong
(74) *Attorney, Agent, or Firm* — LK Global (57) ABSTRACT

The present invention is a method and apparatus for providing the user instructional information describing the operation of their television receiving device system.

18 Claims, 4 Drawing Sheets

(56) References Cited

U.S. PATENT DOCUMENTS

2004/0261112 A1* 12/2004 Hicks, III ............... H04N 5/76
725/89

* cited by examiner

METHOD AND APPARATUS FOR RECORDING A VIDEO PROGRAM FOR USER INSTRUCTION

FIELD OF THE INVENTION

The present invention relates to television recording devices for receiving and recording channels of television programming. More particularly, the invention relates to a method and apparatus for recording and presenting instructional materials.

BACKGROUND

Various devices exist that can receive television signals. These devices may be provided to subscribers of a pay television service. A pay television service involves a pay television distributor transmitting a television signal to a group of subscribers. Examples of pay television distributors include, but are not limited to, cable television and satellite television distributors.

A television converter may allow a subscriber or user to receive a pay television signal. More recent television converters may receive or download software from the pay television distributors. This software may improve, enhance or add features to the set-top-box.

In these devices, the user may need to discover the new software and learn to use the software on their own. On occasion, pay television distributors may fail to provide a user's manual for their television converters. Even where a user manual is provided by the pay television distributor, the user's manual may not describe or may incorrectly describe the new software. Thus, there exists a need to inform users of software that is placed on their television converter and explain how to use features of the new software.

Another problem may arise when the user decides to install, by himself or herself, the subscriber television system. If the user subscribes to satellite television service, the user may need to install a satellite dish antenna. The installation of the satellite dish may be very complicated. The user may need to correctly mount the dish to the user's home or business. The user may need to point the dish to an exact point in the sky to receive the satellite signal. The user may then need to wire the satellite dish correctly. The user may also need to correctly connect the satellite dish to the television converter. Instructions for installation of the subscriber television system may also be complicated and difficult to understand.

Thus, there also exists a need to provide the user with understandable and easily accessible instructional information that may be related to the operability or the installation of the system. These and other deficiencies of the prior art are overcome by the present invention.

BRIEF SUMMARY OF THE INVENTION

The present invention is a method and apparatus for providing the user instructional information describing the operation of their television system. Other features and advantages of the present invention will be described below in a detailed description of certain embodiments of the invention. These embodiments are illustrative and do not set out the full scope of the invention which is defined in the claims.

For clarification, the drawings use a nomenclature for reference numerals that has two parts. The first part of the reference numeral is the drawing number, and it is followed by the second part, a two digit identifier (drawing 1 uses 1xx; drawing 3 uses 3xx). For example, two reference numerals in drawing 1 may be "102" and "104." A reference numeral in one drawing may be referred to in subsequent drawings; the same reference numeral in later drawings refers to the same item.

DETAILED DESCRIPTION OF THE INVENTION

In this specification, the present invention will be described using methods and systems related to subscriber satellite television service. This specific description is not meant to limit the invention to that one embodiment. The present invention may also be applicable to cable television systems, broadcast television systems or other television systems. The present invention is also described in terms of digital video recording (DVR) devices. The present invention may also be applicable to digital-versatile-disc (DVD) recording devices or other television recording devices. One skilled in the art will recognize that the present invention can apply elsewhere.

As a general matter, the disclosure uses the term "signal." One skilled in the art will recognize that the signal may be any digital or analog signal. Those signals may include, but are not limited to, a bit, a specified set of bits, an A/C signal, or a D/C signal. Uses of the term "signal" in the description may include any of these different interpretations. It will also be understood to one skilled in the art that the term "connected" is not limited to a physical connection but can refer to any means of communicatively or operatively coupling two devices.

As another general matter, the disclosure uses the terms "television converter," "receiver," "set-top-box," "television receiving device," "television receiver," "television recording device," "satellite set-top-box," "satellite receiver," "cable set-top-box," "cable receiver," and "television tuner" to refer interchangeably to a converter device or electronic equipment that has the capacity to acquire, process and distribute one or more television signals transmitted by broadcast, cable, telephone or satellite distributors. "Digital video recorder (DVR)" and "personal video recorder (PVR)" refer interchangeably to devices that can digitally record and play back television signals and that may implement trick functions including, but not limited to, fast-forward, rewind and pause. As set forth in this specification and the figures pertaining thereto, DVR and PVR functionality or devices may be combined with a television converter. The signals transmitted by these broadcast, cable, telephone or satellite distributors may include, individually or in any combination, internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite set-top-boxes.

As yet another general matter, it will be understood by one skilled in the art that the term "television" refers to a television set or video display that may contain an integrated television converter device (e.g., an internal cable-ready television tuner housed inside a television) or, alternatively, that is connected to an external television converter device (e.g., an external set-top-box connected via cabling to a television). A further example of an external television converter device is the EchoStar Dish PVR 721, Part Number 106525, combination satellite set-top-box and PVR. For the remainder of this disclosure, specific embodiments will be described using a television converter device that implements satellite technology.

Finally, as a general matter, it should be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO™, CSPAN™, ABC™, CBS™, or ESPN™. In satellite television, a service provider can also be compared to a "channel."

The term "channel," as used in this description, carries a different meaning from its normal connotation. In broadcast television, different analog signals of a television station may be carried on a carrier frequency and its sub-channels. A tuner in a television may then acquire and process these signals. In broadcast television, the term channel has thus become synonymous with the sub-channel or the station on that sub-channel. The normal connotation of the term "channel" is therefore not always appropriate to describe satellite television transmissions where multiple stations may be multiplexed onto a single carrier frequency. Satellite television distributors, however, may organize the satellite data into a group of different "virtual channels." These virtual channels give the impression that the satellite television programs (the service providers) are placed in channels. This impression may assist user operation of the satellite set-top-box since it models an analog television or analog receiving device. The virtual channels may appear in the electronic program guide (EPG) data and the user may choose programming by selecting a virtual channel. For instance, the user can select HBO, which may be on virtual channel 300, or CSPAN, which may be on virtual channel 210. These service providers or virtual channels are not necessarily carried in the same signal being sent from the same satellite. EPG data may come from a service provider (e.g., HBO), content provider (e.g., Disney), a third party (e.g., TV Guide) or from another outside entity.

Thus, in satellite television service a channel may not be the same as in broadcast television service. Rather, channels may be more properly termed service providers in satellite television service. The term "channel" will be used in this description to describe the service providers and the virtual channels they may occupy.

Figure 1:
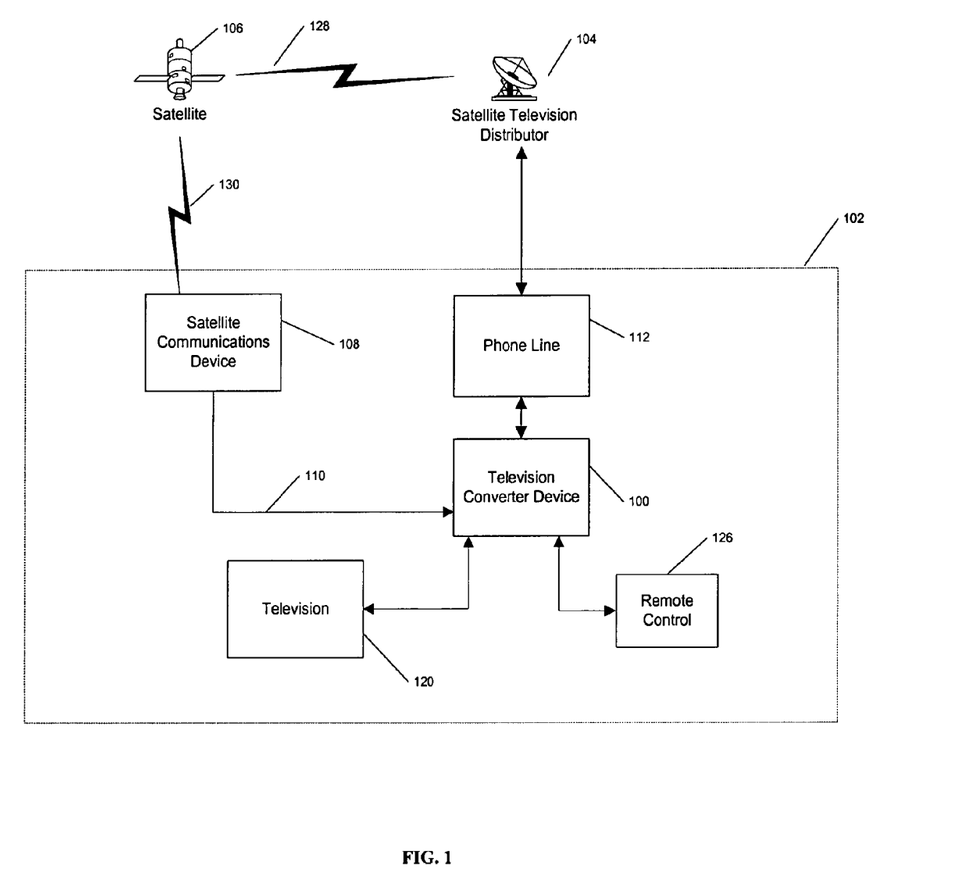
FIG. 1 shows one embodiment of the home entertainment system according to the present invention and the environment it occupies.

FIG. 1 presents an embodiment of a home entertainment system 102 that includes a television converter device 100 in the form of a satellite set-top-box. Generally, the satellite set-top-box 100 may receive one or more television signals from a cable television distributor (not shown), from a broadcast television distributor (not shown) or from a satellite television distributor 104. As a preferred embodiment, home entertainment system 102 receives signals from satellite television distributor 104. One skilled in the art will recognize that set-top-box 100 may also receive video-digital subscriber line (DSL), DSL, Internet, wireless and other signals from content or video distributors. The satellite set-top-box 100 may process television signals and may send the processed signals to peripheral electronic devices, such as a television 120 and remote control 126. The satellite set-top-box 100 also may accept commands from a remote control 126 or other peripheral electronic devices. More detail about the functionality of the satellite set-top-box 100 is provided below.

To further describe the home entertainment system, embodiments relating to receiving satellite television signals will be explained in more detail. A satellite television distributor 104 may transmit one or more satellite television signals 128 to one or more satellites 106. Satellite television distributors may utilize several satellites 106 to relay the satellite television signals to a subscriber. Each satellite 106 may have several transponders. Transponders transmit the signal 130 from the satellite to the subscriber. For example, these signals 130 may be transmitted at a frequency of 2150 Mhz.

A transponder may also polarize the transmitted signal 130 in several ways. One form of polarization in satellite transmissions is circular polarization. For example, transponders of satellite 106 may transmit two signals (together as signal 130) on the same transponder, one signal that is right-hand polarized and another signal that is left-hand polarized. In other words, two signals may be simultaneously transmitted with opposite polarizations. The opposite polarizations may prevent interference. One skilled in the art will recognize that other ways of polarizing signals are possible.

The polarized signals can be received at satellite communication device 108. The satellite communication device 108 may include one or more of the components that follow. One component of satellite communication device 108 may be a satellite dish. A satellite dish can focus the signal on one or more low-noise block filters (LNBF), also referred to as low-noise block down converters (LNBDC). The LNBFs may de-polarize and initially process the signal. This initial processing may include filtering noise from the signal and down-converting the signal. Down-conversion is sometimes required to transmit the signal 110 through certain cables, such as coaxial cables. The signal 110 arrives at the television converter device 100 via cabling. One skilled in the art will recognize that other methods and other systems of delivering the satellite signal 110 to the satellite set-top-box 100 may be possible.

Figure 2:
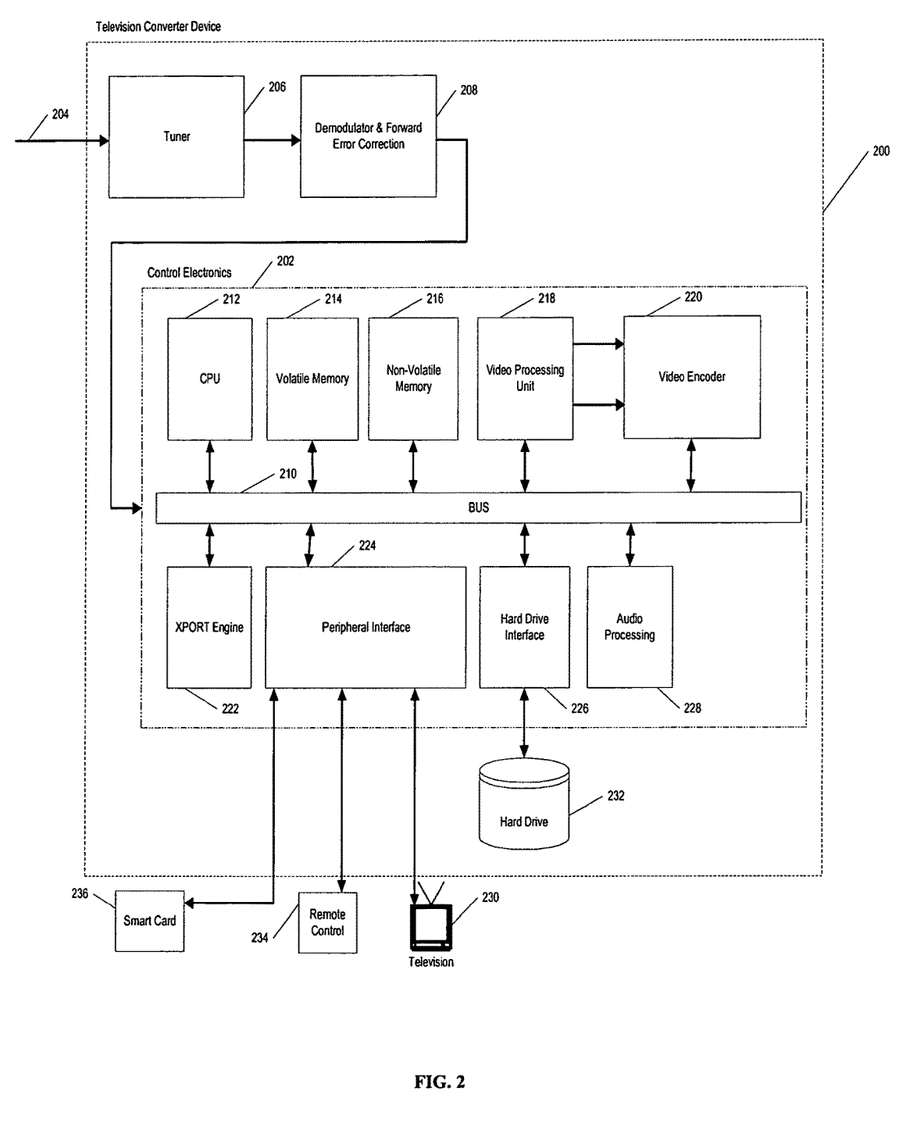
FIG. 2 shows the logical elements of one embodiment of a television converter according to the present invention.

FIG. 2 provides a high level block diagram for the satellite television converter device 100, 200 with DVR functionality in accordance with the present invention.

The signal 110, 204 that arrives at the satellite set top box 200 may undergo extensive processing. The television converter 200 may include one or more tuner devices 206 that may receive a satellite signal 204. In this embodiment, tuner device 206 acquires a satellite signal 204 from satellite television distributor 104. Tuner device 206 may initially process the satellite signal 204. Tuner device 206 may also receive subscriber commands in the form of signals from control electronics unit 202. Signals from control electronics unit 202 may include, but is not limited to, a signal to tune to a transponder as part of the process of selecting a certain channel for viewing on a peripheral device. One skilled in the art would recognize that the tuner device 206 may include fewer, more, or different components.

After receiving the signal 204, one of the first steps may be to demodulate 208 the signal 204. The signal 204 may arrive as an analog signal that "carries" data (e.g., data is modulated onto the analog signal). Demodulation 208 may be accomplished by reversing the modulation process. Modulation can be done in several ways. Modulation may include amplitude modulation (AM) or frequency modulation (FM). If the carried data is digital, modulation methods include, but are not limited to, biphase-shift keying (BPSK), quadraphase-shift keying (QPSK), or eight-phase shift keying (8PSK). One skilled in the art will recognize that other methods of modulating and demodulating the signal 204 may be possible. Another one of the first steps may also be to error check 208 signal 204. One example of error checking 208 is forward error checking (FEC). FEC 208 may include, but is not limited to, inspecting parity bit or bits that may accompany signal 204. One skilled in the art will recognize that many methods for error checking are possible. For the purposes of discussion, an embodiment using digital data will be discussed below. However, one skilled in the art will recognize that systems with analog data or combined analog and digital data are also possible and contemplated herein.

In this embodiment, satellite set-top-box 200 contains control electronics unit 202 that receives satellite signal 204. One skilled in the art will recognize that control electronics 202 may receive other signals, including, but not limited to, signals from a cable or broadcast television distributor. One example of a control electronics unit 202 is the STMicroelectronics STi5517 Low-Cost Interactive Set-top Box Decoder, Part No. 7424736A. In a preferred embodiment, control electronics unit 202 includes discrete electronic components combined into a single circuit with a shared bus 210. In other embodiments, control electronics unit 202 may be configured differently. For example, one or more of the control electronics unit 202 components in set-top-box 200 may be combined or omitted. The control electronics unit 202 may use a custom ASIC, such as from the LSILogic Gll family, or FPGA, such as from the Altera Stratix™ family. As a further example, one or more of the control electronics unit 202 components in set-top-box 200 may not share a bus 210, but may nonetheless be operatively connected by some other means. One skilled in the art will recognize that other configurations of set-top-box 200 and control electronics unit 202 are possible and within the scope of this invention. One skilled in the art will further recognize that some components of set-top-box 200 and control electronics unit 202 may be implemented in hardware or software. The control electronics unit 202 may operate under the control of a software program, firmware program, or some other program stored in memory or control logic. One skilled in the art will also recognize that the control electronics unit 202 may include other electronic components or structures to mediate or process signals.

Control electronics unit 202 may contain one or more central-processing-units (CPUs) 212 or processors. A preferred embodiment of control electronics unit 202 contains a single CPU 212 that is operatively connected to the shared bus. In one embodiment, CPU 212 may be used, among other things, for logical operations for set-top-box 200 functions including, but not limited to, channel selection, recording control, EPG display and control and system maintenance. Examples of commercially available CPUs 212 include the STMicroelectronics Enhanced ST20 32-bit VL-RISC, Motorola 68000 or Intel Pentium processors. One skilled in the art will recognize that the CPU 212 may be integrated with memory or other discrete electronics components.

Control electronics unit 202 may also contain one or more volatile memory components 214. Volatile memory components 214 may include, but are not limited to, one or more SDRAM memory chips. Similarly, control electronics unit 202 may contain non-volatile memory components 216. Non-volatile memory 216 may include one or more memory chips, including, but not limited to, ROM, SRAM, SDRAM and Flash ROM. One skilled in the art will recognize that volatile memory 214 and non-volatile memory 216 may be integrated within other electronics components. One skilled in the art will also recognize that other memory components may be included within set-top-box 200 and control electronics unit 202. One skilled in the art will recognize that memory 214, 216 may be used for many purposes, including, but not limited to, storing EPG data and storing data for use by CPU 212.

In a preferred embodiment, signal 204 is in digital form (e.g., a digital stream) after demodulation and error correction. For example, digital stream 204 may use, but is not limited to using, the digital video broadcasting (DVB) transport standard. The digital stream 204 may be multiplexed and therefore require demultiplexing by XPORT Engine 222. Demultiplexing 222, or demuxing, may include separating the bits of data into separate digital data streams. The digital streams may be packetized. Thus, the multiplexing of the separate digital data streams may not be bit-by-bit but packet-by-packet. The packet size may vary or may be constant. After demuxing 222 the packets, the separate digital data streams may be reassembled by placing related packets together in a continuous data stream 204.

Each of the separate digital data streams may also be encoded. Encoding is a method for representing data. Encoding may allow the data to be compressed. Compression can provide the system with increased bandwidth. One skilled in the art will recognize that several different encoding formats are possible. In satellite television, encoding formats may include the MPEG or MPEG2 standards. Beyond the raw data, the separate digital data streams may include forward error correction, headers, checksums, or other information. All of this different information may be included in the digital television signal 204 processed by the satellite set-top-box 100. Control electronics unit 202 may therefore include one or more video processing units 218 that, among other video processing operations, may decode encoded signal 204. In a preferred embodiment, video processing unit 218 may include, but is not limited to, a graphics processor, MPEG-2 decoder and a display compositor with separate on-screen display (OSD) control for peripheral devices. One skilled in the art will recognize that video processing unit 218 may also include other electronics, including, but not limited to, alpha blending, antialiasing, antiflutter and antiflicker filters, memory and video-rendering components.

Another discrete electronic component of control electronics unit 202 may be a video encoder unit 220. Video encoder unit 220 may work in combination with or independently from video processing unit 218. Video encoding unit 220 may encode digital stream 204 for output to one or more peripheral devices, including, but not limited to, a television. For example, video encoding unit 220 may encode digital stream 204 for RGB, CVBS, Y/C and YUV outputs. Encoding may allow program data to be compressed. As a preferred embodiment, video encoder 220 may translate digital stream into a signal using the NTSC, PAL or SECAM standards. One skilled in the art will recognize that video encoder unit 220 may include other functionality, may be integrated into other electronic components of satellite set-top-box 200, and may encode digital stream 204 using other standards, including, but not limited to, MPEG and MPEG2.

Control electronics unit 202 may also include one or more hard drive interfaces 226 and hard drives 232. In a preferred embodiment, television converter device 200 contains one hard drive interface 226 and hard drive 232. Hard drive 232 may be used for many purposes, including, but not limited to, storing recorded programs, buffering currently-playing programs (e.g., buffering a program may allow a user to pause or rewind a program), storing EPG data, storing commands or functions for the control electronics unit 202, storing timers or record events, and storing data for other devices within or connected to the satellite set-top-box 200. As another example, hard drive 232 may be used to temporarily store data for processing by CPU 212. In this example, the hard drive 232 may allow the processor 212 to separate EPG data arriving as part of digital stream 208. One skilled in the art will recognize that other storage devices and interfaces may be substituted for hard drive interface 226 and hard drive 232 and are within the scope of this invention. One skilled in the art will also recognize that hard drive interface 226 and hard drive 232 may separately or together include an integrated memory (e.g., a memory buffer, commonly known referred to as cache) and additional processing components or logic. One skilled in the art will also recognize that hard drive interface 226 may be integrated into peripheral interface 224 (described below). Finally, one skilled in the art will recognize that hard drive 232 may be external and connected to satellite set-top-box 200. For example, an external hard drive 232 may be connected to satellite set-top-box 200 using USB 2.0 or IEEE 1394 (FireWire) connections. Such an external hard drive may include a screen for portable viewing of programming stored on it.

An audio processing unit 228 may also be part of the control electronics unit 202. Audio processing unit 228 may decode the digital stream 204 for output to peripheral devices, including, but not limited to, a stereo, television speakers or portable audio or video players. For example, audio processing unit 228 may decode MPEG-1 layers I/II and layer III, Dolby Digital, Dolby ProLogic, SRS/TruSurround encoded audio in digital stream 204. Audio processing unit 228 may include one or more processors, memory components or digital to audio converter (DAC) systems. One skilled in the art will recognize that other audio processing components and functionality may be accomplished using audio processing unit 228.

A satellite set-top-box 200 may be connected to one or more peripheral electronic devices through peripheral interface 224. These peripheral devices may include a stereo (not shown), television 230, smart card 236, VCR (not shown), or other devices. In a preferred embodiment, home entertainment system 102 minimally contains, but is not limited to, a television 230 and smart card 236. Television 230 may serve many purposes, including, but not limited to, displaying television programming, displaying the EPG, displaying timer conflicts, and displaying other types of data, graphics and programming. Peripheral devices may receive and/or send signals from the satellite set-top-box 200. For instance, the television 230 may receive video and audio signals and a stereo may receive only audio signals. A camcorder (not shown), on the other hand, may send video or audio signals to the satellite set-top-box 100 or receive audio and video signals from the set-top-box to record. As another example, peripheral interface 224 may include a processor or other electronic components to permit an interface to content security devices such as an external "smart card." In this example, peripheral interface 224 may then encrypt or decrypt content for output to other peripheral devices. Thus, peripheral interface 224 may perform one or more functions for multiple peripheral devices, including, but not limited to, the synchronous or asynchronous transfer of data between different peripheral devices (e.g., decrypting content using a smart card peripheral device and outputting decrypted content to a television at the same time). One skilled in the art will recognize that the peripheral devices may include many types of commercially available electronic devices.

The home entertainment system 102 may also include a remote control 126, 234 peripheral device, also sometimes referred to as a remote. The remote control 234 may be used to send commands to the satellite set-top-box 200. The remote control 234 may send commands via a wireless connection using, for example, infrared or UHF transmitters within the remote control 234. One example of an embodiment of a remote controller 234 is the EchoStar Technologies Corporation 721 Platinum Plus Remote, Part Number 121150, that includes an IR transmitter and an ultra high frequency (UHF) transmitter. The remote control 234 may be able to send signals to other peripheral electronic devices that form part of the home entertainment system 102, including, but not limited to, a television, stereo, VCR, or DVD player. The set-top-box 200 may also be able to send signals to the remote control 234, including, but not limited to, signals to configure the remote control 234 to operate other peripheral devices in home entertainment system 102. In some embodiments, the remote control 234 has a set of Light Emitting Diodes (LEDs). Some remote controls may include Liquid Crystal Displays (LCDs) or other screens. The remote control may include buttons, dials, or other man-machine interfaces. While the remote control 234 may often be the common means for a subscriber to communicate with the satellite set-top-box 200, one skilled in the art will recognize that other means of communicating with the set-top-box 200 are available, including, but not limited to attached keyboards, front panel buttons or touch screens.

The satellite set-top-box 200 may also include a remote control interface (not shown). A remote control interface may include any means for the user to communicate to the satellite set-top-box 200, and may be implemented using the peripheral interface 224 of control electronics unit 202 or by connecting a peripheral remote control interface device. In a preferred embodiment, a remote control interface may receive commands from one or more different remote controls 234. Remote control 234 may use infrared, UHF, or other communications technology. The remote control interface may therefore translate an input from the user into a format understandable by the control electronics unit 202. The translation systems may include, but are not limited to, electronic receivers and electronic relays. One skilled in the art will recognize that other means to receive and translate user inputs are possible.

Another peripheral device and connection to the satellite set-top-box 200 may include a phone line (not shown) and modem (not shown). Set-top-box 200 may use a modem and phone line to communicate with one or more outside entities or systems (e.g., satellite television distributor 104). The phone line may carry local or long-distance telephone service. One skilled in the art will recognize that the phone line may also carry other services, including, but not limited to, DSL service. These communications may include requesting pay-per-view programming, reporting of purchases (for example, pay-per-view purchases), obtaining updates to subscriber programming (e.g., updating EPG data), or receiving updates to software on the satellite set-top-box 100. For example, the phone line may communicate with the satellite set-top-box 100 using an RJ-11 style telephone connection. One skilled in the art will recognize that there are many other uses for this phone line connection. For example, EPG data may be transmitted to set-top-box 200 via phone line or in the satellite signal 204. One skilled in the art will recognize that the EPG data may be transmitted to set-top-box 200 by various other methods, systems and outside entities. Also, one skilled in the art will recognize that a phone line connection to satellite distributor 104 may represent other communication connections, including, but not limited to, wireless, Internet, or microwave communications connections. Another function of the phone line may be to periodically receive the EPG data.

Figure 3:
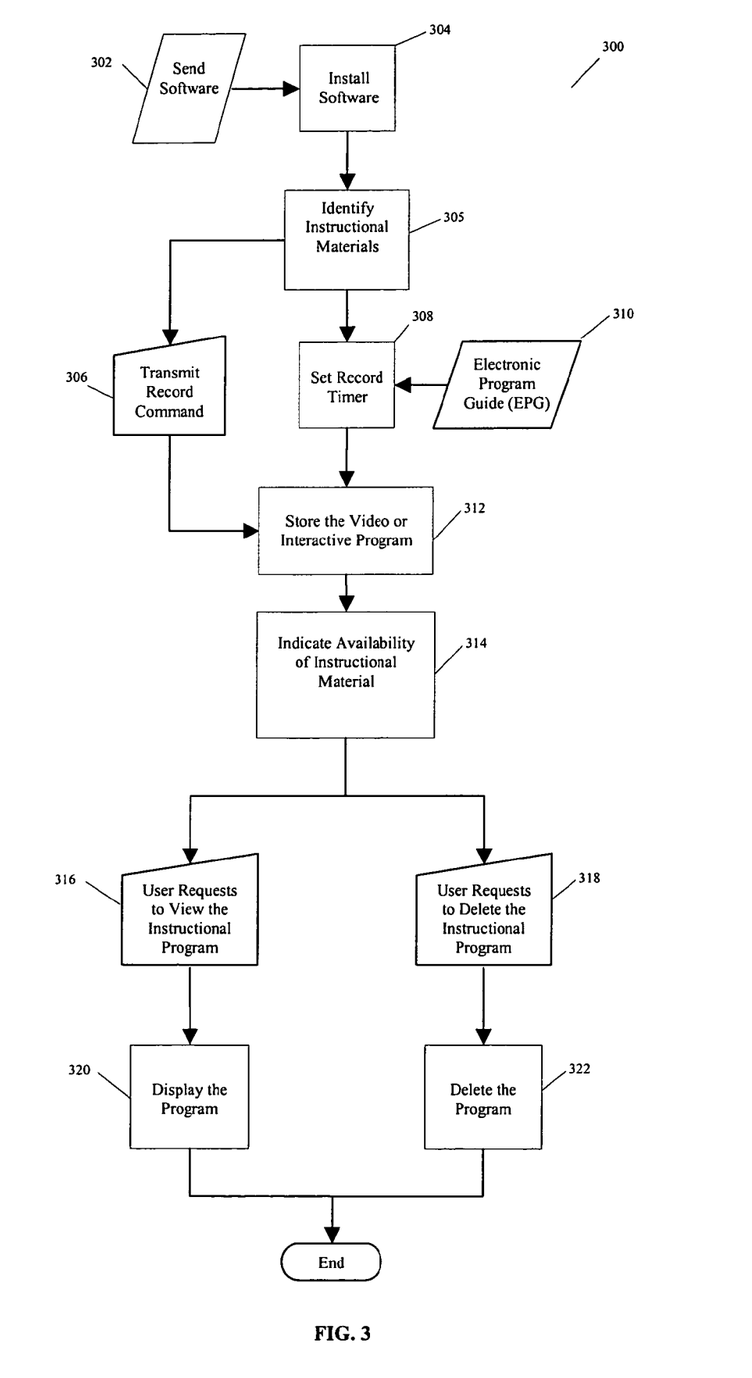
FIG. 3 shows the logical steps of one embodiment of a method to inform the user of installed functionality.

FIG. 3 is one embodiment of a method 300 according to the present invention. In this embodiment of the invention, a satellite television distributor 104 sends 302 a software download to the satellite set-top-box 100. One skilled in the art will recognize that sending 302 software may include, but is not limited to, receiving and storing the software by the satellite set-top-box 100. A download may be completed by sending software to the phone line 112. In another embodiment, the satellite television distributor 104 may transmit the software to all satellite set-top-boxes 100 receiving the signal from the satellite 106 by including the software in the signal 130 sent from the satellite. The software may be multiplexed data embedded in the satellite signal or a burst of data transmitted on an unused transponder on the satellite 106. The software may be stored at the satellite set-top-box 100. One skilled in the art will recognize that there are other means available to download software to the satellite set-top-box 100 and the above examples should not be considered limiting.

The software download 302 may create an alternative, different, new or other type of feature or functionality for the satellite set-top-box 100, 200. The control electronics 202 may install 304 the software. By sending 302 and installing 304 the software, the control electronics 202 may execute or operate the software features or functionality. Examples of software features may include, but are not limited to, a new method for selecting a program to record, an alternative method for providing picture-in-picture functionality, an alternative electronic program guide display, and additional parental controls features. One skilled in the art will recognize that many software features are possible and within the scope of this invention.

Many of these software features may be complicated. In some embodiments, the software feature may be undiscoverable without instructions. Thus, the satellite television distributor 104 may elect to send the user instructional information about the software feature. One skilled in the art will recognize that software features, in some embodiments, may be comprised entirely of instructional information or materials. If instructional information is to be sent, the satellite television distributor 104 may identify 305 the instructional materials to send. This identification 305 may match an instructional program with a software download (e.g., sending 302 and installing 304 software functionality). In one embodiment, the satellite television distributor 104 may send an instructional program that only describes the new software features. In other embodiments, the satellite television distributor 104 may send additional instructional materials or material wholly unrelated to the software features or functionality sent to the user.

The instructional materials may be related to the operation of the satellite set-top-box 100. The instructional materials may also educate the user about the features of the satellite set-top-box 100. In addition, the instructional materials may describe old features in addition to new features. One skilled in the art will recognize that other types of information may be contained within the instructional materials.

In one embodiment, the instructional material may be an instructional video. The video may include an audio/visual program. The audio/visual program may be a recording of a person using a software feature, a person generally explaining the software feature, or a person giving a set of step-by-step instructions. In other embodiments, the audio/visual program may include graphics, animation, or visual and sound effects. The video may show how to use a new software feature, what the feature does, or why the feature was installed.

In another embodiment, the instructional material may be an interactive program. The interactive program may illicit inputs from the user or otherwise involve the user in the program. For instance, the program may have the user punch in commands on the remote control 126 to bring up or use the software feature. In other embodiments, the interactive program may require the user to do something to ensure proper functioning of the software feature. As an example, the program may have the user perform a function then report the result by punching a button on the remote control 126. In other embodiments, the satellite set-top-box 100 may have the user send an approval or acknowledgement message to the satellite television distributor 104 after viewing the program. One skilled in the art will recognize that other variations of interactive programs are possible and within the scope of this invention.

Methods for downloading the instructional material may vary. In one embodiment, the satellite television distributor 104 may set 308 a record timer to download the instructional material. Alternatively, a satellite television distributor 104 may transmit 306 a record command to record the instructional material. In accordance with the following embodiments, instructional data may therefore be received by the satellite set-top-box 100.

In one embodiment, a recording timer may be used to record instructional material. The recording timer may be set 308 using EPG information 310. The satellite set-top-box 200 may store the recording timer. Before recording the instructional material, the control electronics 202 may update the timer. The EPG data 310 is a set of programming information that may include, but is not limited to, program information such as the program title, event ID, start time, stop time, duration, or description. One skilled in the art will recognize that the EPG 310 may include many other data records. In a preferred embodiment, the EPG data 310 is updated periodically and frequently. Information may be extracted from the EPG 310 for use by the control electronics 202. In the present invention, this EPG data 310 may be used by the control electronics 202 to set or update record timers.

A record command 306 may also be used to record instructional material. In other words, the control electronics 202 may accept record commands directly from a satellite television distributor 104 without setting a timer. A record command 306 may require an immediate record of a program. For example, the control electronics 202 may immediately process, store and display incoming instructional material from the data stream 204.

The control electronics 202 may record from one or more channels that may be hidden from the user. A hidden channel may include, but is not limited to, data sent via the satellite 106 that is not available to the user. This hidden channel may be a high-speed data channel that sends data at a higher frequency. This high-speed channel may also be a dedicated data channel or a channel that only transmits at high-speed periodically. For instance, a transponder on the satellite may be dedicated to the high-speed transmission of the instructional information. The hidden channel may also be a low-speed data channel. The hidden channel may be dedicated to transmitting instructional programs or other data. An immediate record may also occur as a background event while the system is operating. In other words, the instructional material may be recorded while the user is operating the system and unaware of the record timer or command. One skilled in the art will recognize that other ways of transmitting instructional materials are possible and within the scope of this invention.

In further embodiments, a satellite television distributor 104 may send the data without a record command. The transmitted data may be stored automatically without commanding the system to record. For instance, the control electronics 202 may recognize a data download and immediately start storing all data that is transmitted by satellite 106. In another embodiment, the record may occur when the television converter is likely to be unused. For instance, the television converter may record instructional material late at night, when the user may not be using the system.

The control electronics 202 may store 312 this information. In some embodiments, the satellite television distributor 104 may specify where to store the instructional material. In other embodiments, the control electronics 202 may determine where to store the instructional material.

The control electronics 202 may also indicate 314 that instructional materials are available for presentation to the user. An indication may include, but is not limited to, a visual or audio prompt that tells the user a recorded instructional program is available. The prompt may alert the user to view, delete, or ignore the program. In one embodiment, the instructional material may be stored and ready for viewing. In another embodiment, the instructional material may be viewed in real time or at some point while it is downloaded or recorded (e.g., using a hard drive 232 to buffer the instructional material to the display).

The indication 314 may be accomplished using a television 120 to present the information in a graphical user interface (GUI) to the user. One skilled in the art will recognize that the GUI may take many forms. In one embodiment, the GUI may be a list of recorded programs. This list may have one or more previously recorded programs listed from top to bottom. Instructional material in the form of a program may be listed as the first entry. In other words, the instructional program may be the most prominent program listed. In other embodiments, the instructional material may have some visual indicia to draw a user's attention to the entry. For instance, the entry associated with the instructional material may be highlighted or blinking. One skilled in the art will recognize that there are other means to prominently display instructional material in a GUI.

In other embodiments, the GUI may incorporate a pop-up-window. The pop-up-window may appear on the television 120 when the user powers on the satellite set-top-box 100. The pop-up-window may show information describing the instructional material. This information may include, but is not limited to, showing a description and duration for the instructional material. In one embodiment, the pop-up-window may have an on-screen button to push if the user wants to view the program. This button may be pushed by placing a cursor over the button and punching the appropriate key on the remote control 126. One skilled in the art will recognize that a pop-up-window may appear in other forms.

In another embodiment, the GUI may use a video introduction. A video introduction may include, but is not limited to, an animated or graphical introduction to the instructional material. For example, the introduction may be an animated logo that precedes display of the instructional materials. The user may be prompted either to accept or to decline watching the video introduction and/or instructional material. The user may choose to continue viewing the video introduction and/or instructional material. In another embodiment, the video introduction and/or instructional material may automatically start playing and require the user to stop playback if desired. In yet another embodiment, the user may be rewarded for watching the video introduction and/or instructional materials. One skilled in the art will recognize that other embodiments of the graphical display are possible.

In the present embodiment, the user may request 316 to view the instructional material. A user request to view 316 the instructional materials may then involve transmitting and displaying 320 the instructional material on television 120. In another embodiment, the satellite set-top-box 100 may send the instructional material to an attached computer for viewing. In the case of an interactive program, displaying 320 the instructional material may involve starting an audio/video program on the television and awaiting a user input. In another embodiment, the instructional material may be transmitted to a remote control. In this embodiment, the user may view instructional material on the remote control. Many other methods of displaying 320 the instructional program may be recognized by one skilled in the art.

In another embodiment, the user may request 318 to delete 322 the instructional. In this embodiment, the user may not view the instructional material prior to deleting 322 the instructional material.

Figure 4:
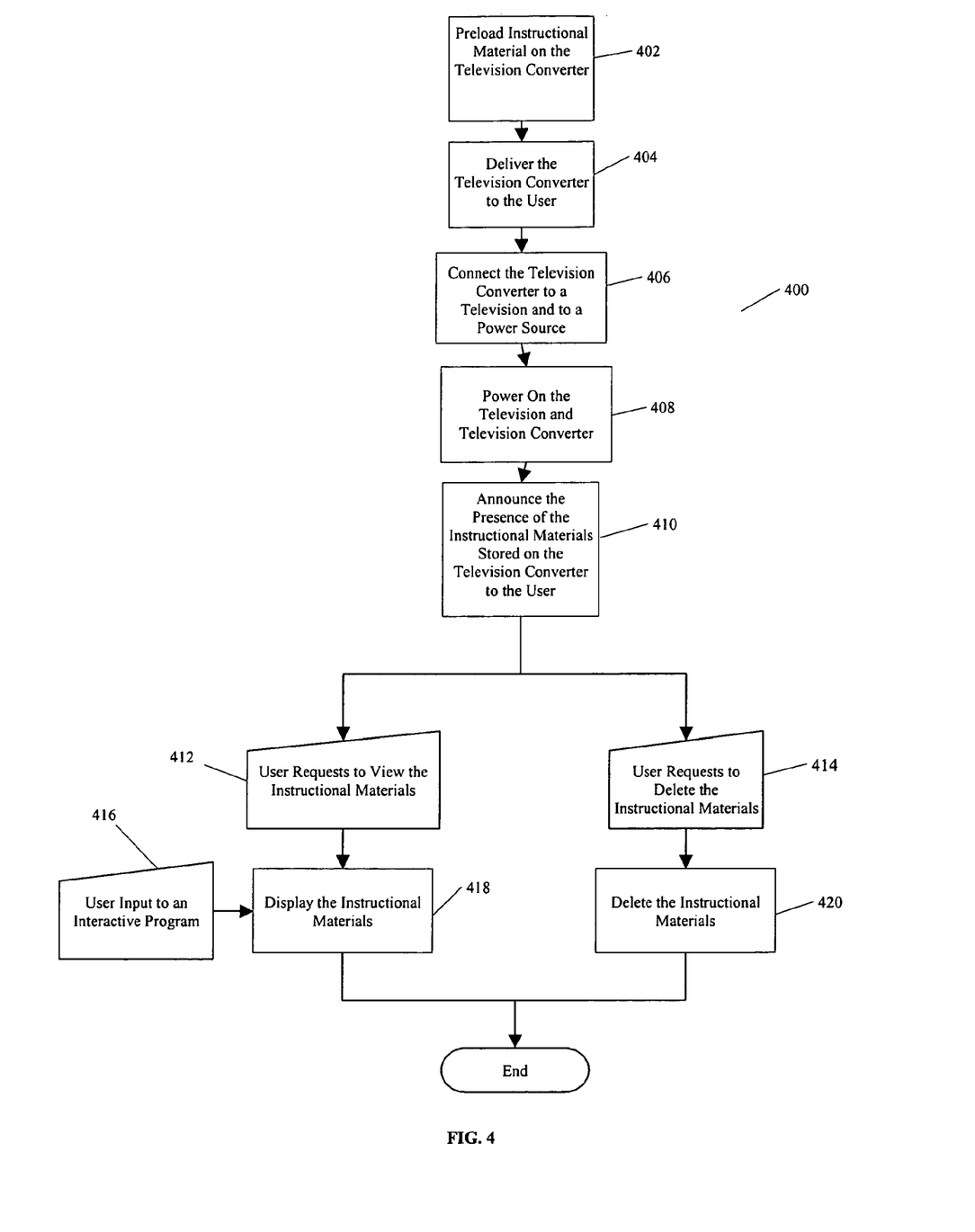
FIG. 4 shows the logical steps of one embodiment of a method to instruct the user on how to install a home entertainment system.

FIG. 4 shows another embodiment of a method 400 for storing and presenting instructional materials to a user. In this embodiment, the instructional materials are pre-loaded 402 into the satellite set-top-box 100. Pre-loading may include, but is not limited to, the storing of the instructional materials at some time before delivery of the satellite set-top-box 100 to the user. Before delivery, a satellite set-top-box 100 may be manufactured, sent to a distributor, and shipped to a retailer. The satellite set-top-box 100 manufacturer may pre-load the instructional materials. In other embodiments the pre-loading may be accomplished by the distributor or a retailer. One skilled in the art will recognize that many different entities may pre-load the instructional materials. In addition, one skilled in the art will recognize that there are many different times when instructional material may be pre-loaded. The satellite set-top-box 100 with the pre-loaded materials may then be delivered 404 to the subscriber.

The preloaded instructional materials may be related to the operation of the satellite set-top-box 100. In one embodiment, the instructional materials may describe or demonstrate how to install the satellite television system. Many satellite television systems may provide other equipment to a user in addition to a satellite set-top-box 100. For instance, the satellite television system may include a satellite dish, a local TV antenna, several switches, certain cabling, and other such equipment.

The user may decide to install the satellite television system themselves. In making this choice, the user may be required to correctly mount the satellite dish, to correctly point the satellite dish to a satellite position, to correctly cable the satellite dish to the satellite set-top-box 100, and to correctly install any switches or other equipment. This process may be difficult, daunting, and confusing.

The pre-loaded instructional materials may aid the user in the installation of the satellite television system. In one embodiment, the user may connect 406 the satellite set-top-box 100 to the television 120 and turn on both of the devices 408. In this embodiment, the satellite set-top-box 100 may then announce 410 that instructional material regarding installation is available for viewing. To watch an instructional program, for example, the user may send a command 412 from the remote control 126 to the control electronics 202. The control electronics 202 may then retrieve and display 418 the instructional program on television 120. If the instructional material is interactive, user inputs may be sent 416 by remote control 126. Should the user decide not to view the instructional material, the user may request 414 to delete the instructional material.

The instructional materials may include a video program showing another person mounting and pointing the satellite dish. In other embodiment, the instructional materials may include instructions and graphics showing how to mount and point a satellite dish. Another embodiment may assess a quality of the user's installation of the satellite dish. One such quality may be the signal strength. The satellite set-top-box 100 may determine the signal strength. This quality of the installation may indicate the effectiveness of the mounting and pointing of the satellite dish. If signal strength is low, the dish may not be pointed correctly. Another quality may be the elevation and azimuth of the satellite dish. The elevation is the angle between where the dish is pointing upwards compared to level or the horizon. The azimuth is the degree of rotation of the dish along an axis from due south. Yet another quality may be the signal interference due to bad cable connections. One skilled in the art will recognize that other qualities may be measured. In yet another embodiment, the satellite set-top-box 100 may provide this information as feedback to the user.

The feedback may be in the form of an audio signal or a video display. The user may then adjust the pointing of the satellite dish until the signal strength is optimized. In this manner, the satellite set-top-box 100 and the user may interact during display of the instructional material. In another embodiment, the user may point the satellite dish until reaching the ideal elevation and azimuth. Another embodiment may have the user check and tighten cable connections until signal interference is minimized. One skilled in the art will recognize other methods for receiving feedback and reacting to that feedback are possible.

In other respects, the preloaded instructional materials may exhibit the same qualities as the instructional materials described in FIG. 3. One skilled in the art will recognize that many of the same processes described in FIG. 3 may apply to the method for preloading the instructional materials, and are incorporated herein by reference.

It will be clear that the present invention is well adapted to attain the ends and advantages mentioned as well as those inherent therein. While a presently preferred embodiment in the form of a satellite set-top-box has been described for purposes of this disclosure, various changes and modifications may be made which are well within the scope of the present invention. For example, an additional algorithm could be included that requires playback of instructional materials to unlock one or more features of a television converter. Numerous other changes may be made which will readily suggest themselves to those skilled in the art and which are encompassed in the spirit of the invention disclosed and as defined in the appended claims.

We claim:

1. A method of providing instructional materials for a television converter having memory, comprising the steps of:

receiving a command to set a record timer at a television converter from a service provider and absent a user input at a first time, the command to set a record timer configuring the television converter to record instructional materials to be broadcast at a second time different from the first time;

setting a record timer, absent a user input, to record the instructional material at the second time and from a certain channel specified by the command;

receiving instructional materials at the television converter at a second time different from the first time; and in response to the recording timer, storing the instructional materials in the memory, the instructional materials being related to the operation of the television converter, and making the instructional materials electronically available for access by a user.

2. A method according to claim 1 wherein the instruction materials relate to a new feature that has been downloaded to the television converter.

3. A method according to claim 1 wherein the instructional materials relate to the installation of the television converter and associated equipment.

4. A method according to claim 3, wherein the instructional materials assess a quality of the user's installation and provide feedback to the user.

5. A method according to claim 1, wherein the instructional materials are an audio visual presentation.

6. A method according to claim 5, wherein the instructional materials are listed along with other audio visual programs that have been recorded by the television converter.

7. A method according to claim 6, wherein the instructional materials are listed as the first entry in the list of recorded audio visual programs.

8. A method according to claim 1, wherein the instructional materials are an interactive program.

9. A method according to claim 8, wherein the interactive program requires input from the user.

10. A method according to claim 1, wherein the television converter stores the instructional materials as a background event.

11. A method according to claim 10, wherein the background event is an unbeknownst operation that occurs while the user is operating the television converter.

12. A method according to claim 10, wherein the background event is an operation that occurs while the television converter is not in operation by the user.

13. A method according to claim 1, wherein the memory is a hard drive.

14. A method according to claim 1, wherein the memory is non-volatile memory.

15. A method according to claim 1, further comprising providing a graphical user interface to a user on a television, wherein the graphical user interface is a pop-up-window that tells the user there is instructional information stored in the memory.

16. A method according to claim 15, wherein the graphical user interface is a start of the instructional materials that requires the user to select later whether to continue viewing.

17. A method of providing audio/visual materials for a television converter having memory, comprising the steps of:
- receiving a command to set a record timer at a television converter from a service provider and absent a user input at a first time, the command to set a record timer configuring the television converter to record audio/visual materials to be broadcast at a second time different from the first time;
- setting a record timer, absent a user input, to record the audio/visual material at the second time and from a certain channel specified by the command;
- receiving audio/visual materials at the television converter at a second time different from the first time; and
- in response to the recording timer, storing the audio/visual materials in the memory, and making the audio/visual materials electronically available for access by a user.

18. A method according to claim 17, wherein the step of making the audio/visual material electronically available for access by a user comprises:
- providing through a graphical user interface an indication that the audio/visual materials are available for presentation; and
- presenting the audio/visual materials related to the operation of the television converter on a television.

* * * * *